United States Patent [19]
Lo et al.

[11] Patent Number: 5,386,480
[45] Date of Patent: Jan. 31, 1995

[54] AMPLITUDE RATIO DISCRIMINATION FOR MTI PROCESSORS

[75] Inventors: Thomas K. Lo, Temple City; Deborah C. Roty, West Hills, both of Calif.

[73] Assignee: Hughes Aircraft Company, Los Angeles, Calif.

[21] Appl. No.: 848,604

[22] Filed: Mar. 9, 1992

[51] Int. Cl.⁶ .................................................. G06K 9/00
[52] U.S. Cl. ........................................... 382/1; 382/31; 382/48; 348/701
[58] Field of Search ................... 382/31, 48, 41, 1; 358/105, 103

[56] References Cited

U.S. PATENT DOCUMENTS

| | | | |
|---|---|---|---|
| 4,590,607 | 5/1986 | Kauth | 382/41 |
| 4,731,859 | 3/1988 | Holter et al. | 382/31 |
| 4,937,878 | 6/1990 | Lo et al. | 382/48 |
| 4,989,259 | 1/1991 | Pedotti et al. | 382/31 |
| 5,020,111 | 5/1991 | Weber | 382/31 |
| 5,068,908 | 11/1991 | Inoue et al. | 382/48 |
| 5,109,435 | 4/1992 | Lo et al. | 358/105 |
| 5,150,426 | 9/1992 | Banh et al. | 382/48 |
| 5,168,530 | 12/1992 | Peregrim et al. | 382/48 |

*Primary Examiner*—Joseph Mancuso
*Attorney, Agent, or Firm*—Randall M. Heald; Charles D. Brown; Wanda K. Denson-Low

[57] ABSTRACT

A system for detecting an object in a scene. The invention (10) includes memory (12) for storing a first frame of image data represented by a plurality of input signals $I_o$. A spatial filter (16) is included for spatially filtering a second frame of image data represented by a plurality of input signals $I_o$ to provide first spatial filter output signals of the form $\eta_s I_o$. These signals are subtracted from the first frame of image data to provide difference signals of the form $\eta_D I_o$, where $\eta_D$ represents a measure of object registration. A second spatial filter (18) is included for spatially filtering the difference signals to provide spatially filtered difference signals of the form $\eta_s \eta_D I_o$. Finally, the signals are processed (30) to extract the measure of object registration $\eta_D$.

11 Claims, 4 Drawing Sheets

AMPLITUDE RATIO DISCRIMINATION FOR MTI PROCESSORS

BACKGROUND OF THE INVENTION

1. Field of the Invention

The present invention relates to method and apparatus for target detection and acquisition. More specifically, the present invention relates to the detection and acquisition of small targets in extremely cluttered background environments.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

The detection and acquisition of small targets in cluttered backgrounds has heretofore been somewhat problematic. For this purpose, a cluttered background is generally regarded as one in which there are many objects in an image having comparable size and intensity. Several techniques are known in the art, none of which are fully effective to suppress bright clutter objects in a cluttered background image.

Spatial filtering, for example, is a static technique which involves object discrimination on the basis of the dimensional criteria or size. However, when the background includes many objects of dimensions close to that of the target, spatial filtering is inadequate for many currently more demanding applications.

Hence, several techniques have been developed in which target acquisition and detection is effected based on the motion of the target relative to the background. One such technique is disclosed in U.S. Pat. No. 4,937,878, entitled SIGNAL PROCESSING FOR AUTONOMOUS ACQUISITION OF OBJECTS IN CLUTTERED BACKGROUND, issued Jun. 26, 1990 to Lo et al. This reference discloses an image processing acquisition system in which an image of the object is generated by first generating a difference between a current image frame and an image frame taken at a previous time, and second, generating a difference between the current image frame and another previous image frame (even earlier than the first image frame). This subtraction procedure eliminates some of the background clutter since the background scenes of the three image frames are essentially the same. The two difference image frames are then logically ANDed such that only the current position of the object of interest is detected.

A second motion based method of detecting a moving object within a cluttered background is disclosed in U.S. patent application No. 5,109,435, issued Apr. 28, 1992, by Sacks et al., entitled SEGMENTATION METHOD FOR USE AGAINST MOVING OBJECTS. In that application, the image frames, including the object of interest, of three consecutive images are correlated together. A median value for each pixel position of the correlated image frames is then selected, and each median pixel value is subtracted from the pixel value of one of the image frames to form a difference image. A threshold intensity value is determined for each pixel position. The threshold values are associated with the object of interest.

Although these two systems have met with favorable success, a need remained for further improvements in the art. U.S. patent application No. 5,150,426, issued Sep. 22, 1992, by Banh et al., entitled MOVING TARGET DETECTION METHOD USING TWO-FRAME SUBTRACTION, (the teachings of which are incorporated herein by reference) discloses a technique which effects the detection of moving objects within a scene by use of a single subtraction of two registered frames of video data. The ability to separate the object of interest from the background clutter by a single subtraction of two registered frames is realized by the combination of scene subtraction, filtering by a minimum difference processor (MDP) filter and multiplying the filtered difference image with the filtered live image.

Though somewhat effective in eliminating background clutter leakage, a need for further improvement remains due to inaccurate registration and dead cells in image sensors by way of example. With respect to the registration problem, it has been found that the performance of the referenced system in terms of clutter cancellation is coupled to image registration accuracy. Extreme registration accuracy is difficult to achieve. Accordingly, this limitation has heretofore been somewhat persistent.

A dead cell is an element of the image sensor that behaves differently from the average. Thus, as the camera moves, the locus of the cell in the object plane moves preventing the subtraction of background data in the two image frames. Hence, dead cells and other camera artifacts (e.g., gain imbalance) adversely affect background clutter leakage.

Accordingly, a need remains in the art for further improvements in conventional frame subtraction MTI processes affording lower false alarm rates and higher detection probabilities.

SUMMARY OF THE INVENTION

The need in the art is addressed by the present invention which provides a system for detecting an object in a scene. The invention includes memory for storing a first frame of image data represented by a plurality of input signals $I_o$. A spatial filter is included for spatially filtering a second frame of image data represented by a plurality of input signals $I_o$ to provide first spatial filter output signals of the form $\eta_s I_o$. The second frame is subtracted from the first frame of image data to provide difference signals of the form $\eta_D I_o$, where $\eta_D$ represents a measure of object registration in the two frames of image data. A second spatial filter is included for spatially filtering the difference signals to provide spatially filtered difference signals of the form $\eta_s \eta_D I_o$. Finally, the signals are processed to extract the measure of object registration quality $\eta_D$.

The invention relaxes registration accuracy requirements in the subtraction process by decoupling registration accuracy from the strength of the clutter elements to be suppressed. This makes the system more tolerant to gain imbalance between images to be subtracted and provides a limited capability to suppress false alarms on uncompensated dead cells or large deviation fixed pattern noise when the seeker is approximately tracking the scene during the acquisition process.

DESCRIPTION OF THE INVENTION

The present invention provides an enhancement to the basic two-frame moving target indicator (MTI) technique, disclosed and claimed in the above-noted Banh et al. reference, for the suppression of residual false alarms on point clutter arising from misregistration, gain imbalance between the images being subtracted, and possibly uncompensated dead cells.

The invention relaxes registration accuracy requirements in the subtraction process by decoupling registration accuracy from the strength of the clutter elements to be suppressed. This makes the system more tolerant to gain imbalance between images to be subtracted and provides a limited capability to suppress false alarms on uncompensated dead cells or large deviation fixed pattern noise when the seeker is approximately tracking the scene during the acquisition process.

The two-frame subtraction MTI method of the Banh et al. reference has been found to be effective in suppression of false alarms arising from extended objects, edges, and linear structures. However, the Banh et al. method experienced false alarms when the scene contained high contrast point like objects. These false alarms occurred even in the face of good clutter cancellation from accurate scene registration and subtraction. The sources of these false alarms included uncompensated dead cells in the image, artifacts in synthetically created images, and naturally occurring point clutter objects with high contrast.

False alarms on high contrast point clutter are endemic with the two frame subtraction technique of Banh et al. and is associated with the portion of the algorithm which rejects target "image" or "ghost" through the geometric mean operation. To fully appreciate the origin of this false alarm problem, a brief explanation of the two frame subtraction technique is provided below.

Figure 1:
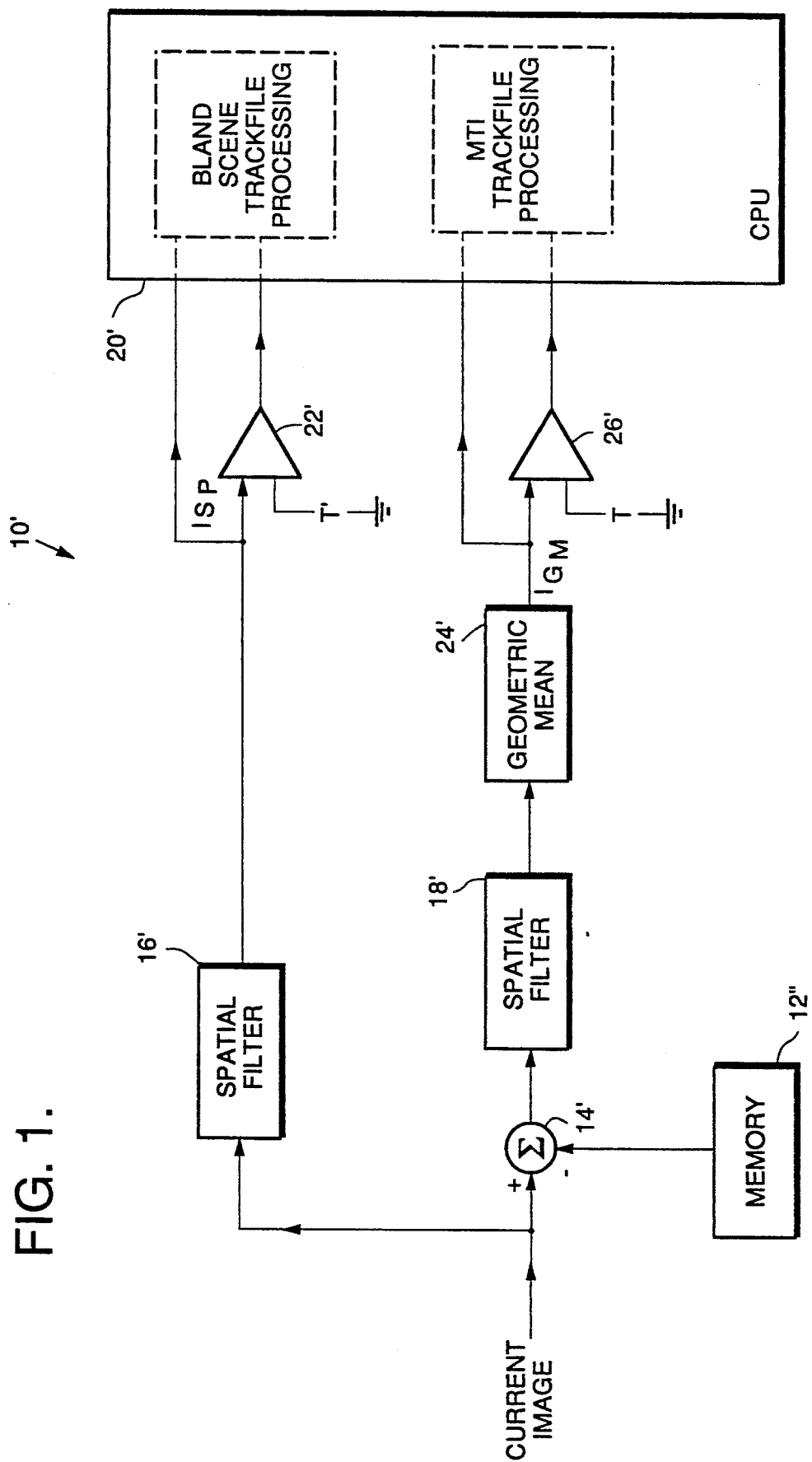
FIG. 1 is a block diagram of an illustrative moving target detection system utilizing the conventional two-frame subtraction technique.

FIG. 1 shows a high level block diagram of the conventional two-frame subtraction system 10'. The system 10' includes a memory 12' which stores a first frame of digitized image data. The stored frame is subtracted from the current digitized frame of image data by a subtractor 14'. The subtractor 14' outputs the difference signal. First and second spatial filters 16' and 18' are included. The first spatial filter 16' operates on the current frame. The output of the spatial filter 16' is input to the processor 20' and thresholded by a first comparator 22'. The output of the first comparator 22' is also input to the processor 20' as the "bland scene" detection. The difference signal is spatially filtered and input to a geometric mean circuit 24'. The output of the geometric mean circuit 24' is input to the processor 20' and thresholded by a second comparator 26'. The output of the second comparator 26' is also input to the processor 20' as MTI detections.

In operation, two images spaced far enough apart in time for the target to be displaced relative to the background by more than one resolution element are background registered and subtracted. In theory, the registered background will be removed in the difference image and the moving target will remain. The difference image is defined so that it has the same coordinate system as the current image. The difference image contains the target and its "ghost" (where the target was in the former image). In practice, the registration between the images to be subtracted is not perfect and residual clutter leakage remains in the difference image. Most of the leakage arising from misregistration tends to be edges of objects in the scene. The spatial filter 18' is used to suppress the leakage. The ghost of the target occurs at a location in the difference image corresponding to the former position of the target and has polarity that is the opposite of the target. To reject the target ghost, the difference image is geometrically meaned with a spatially filtered version of the current image by the geometric mean circuit 24'. The rules for the geometric mean operation are: (1) when the corresponding pixels to be multiplied have opposite sign, the output from the geometric mean is zero and (2) when the inputs to the geometric mean have the same sign, the output magnitude will be the square root of the product of the inputs and the sign of the output will be the same as the sign of the input. In the images multiplied, the target is in alignment whereas the target ghost in the difference image does not have a counterpart in the spatially filtered image. Under ideal circumstances, the output from the geometric mean operation will be the target with relative low levels of clutter leakage and noise. The output of the geometric mean is then threshold detected by comparison with a threshold. Temporal persistence processing is then performed on the thresholded objects to reject noise.

Figure 2:
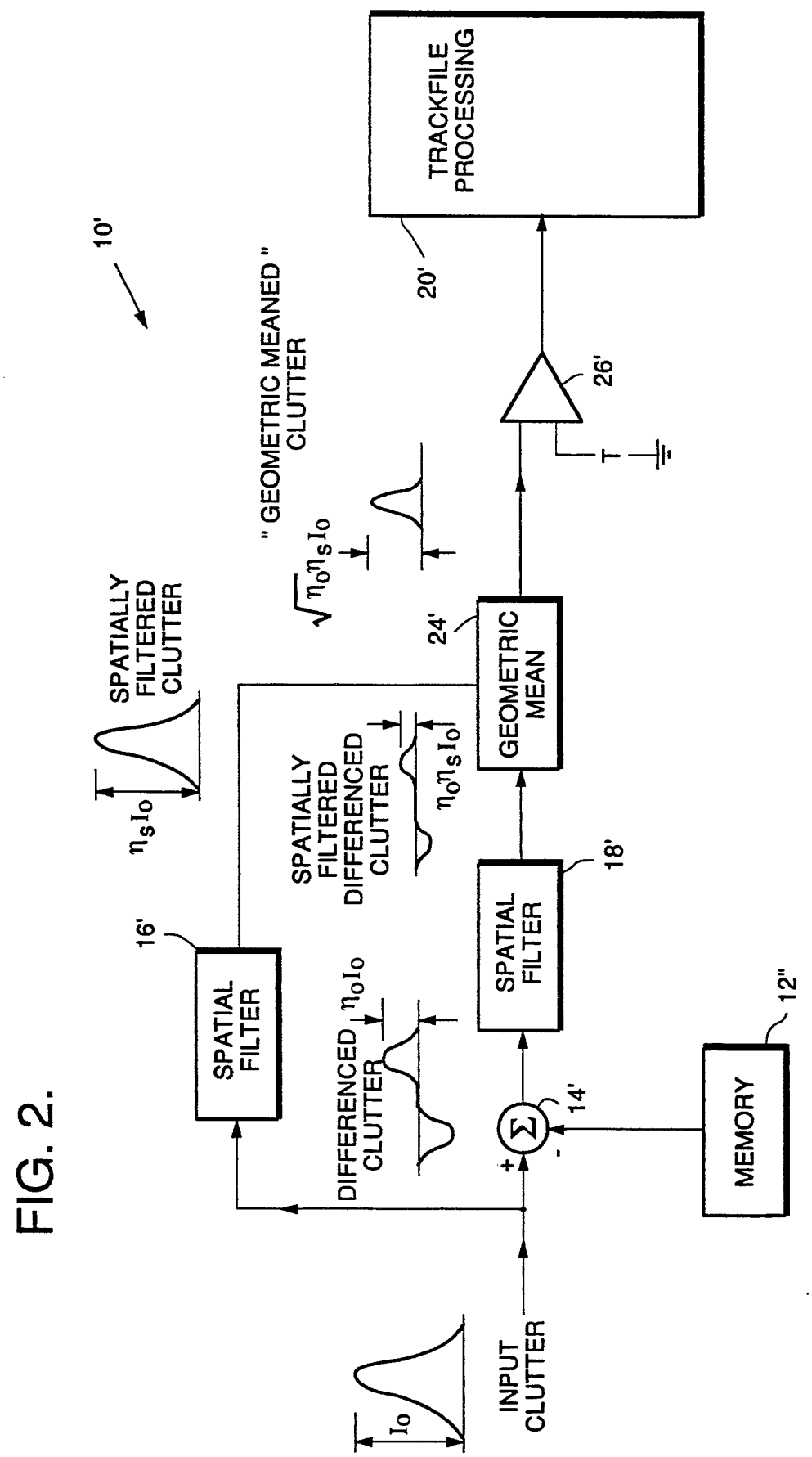
FIG. 2 is a simplified block diagram of the system of FIG. 1 illustrating the progression of a cluttered signal across the signal processing chain thereof.

The residual signal from unresolved clutter is illustrated with reference to FIG. 2 which is a simplified block diagram of the system of FIG. 1 illustrating the progression of a cluttered signal across the signal processing chain thereof. FIG. 2 considers the case of unresolved clutter that is passed by the first spatial filter 16'. The clutter object is a pulse with an input amplitude $I_o$. The spatial filter 16' reduces clutter amplitude by a multiplicative factor $\eta_s$. Therefore the output from the spatial filter 18' is $\eta_s I_o$. Because unresolved objects are passed by the spatial filter, $\eta_s$ is close to 1. In the subtraction path, the clutter amplitude is suppressed by an amount $\eta_D$ as a result of the frame registration and subtraction processes. Thus, the output from the subtractor 14' is $\eta_D I_o$. After spatial filtering of the difference image, the amplitude of the clutter object is $\eta_s \eta_D I_o$. The geometric mean operation then has an output equal to the square root of $\eta_s I_o \eta_s \eta_D I_o = \eta_s I_o (\eta_D)^{\frac{1}{2}}$. Notice that the subtraction only reduced the amplitude of the clutter by the square root of $\eta_D$. Thus, if $\eta_D = 0.1$, the subtraction only suppressed the amplitude of the clutter by 0.316. Typically, scene registration will produce a value of $\leq 0.25$ for clutter objects. Moving targets are not in registration in the two images being subtracted. Therefore $\eta_D \approx 1.0$ for moving objects. As $\eta_D$ is approximately unity for moving objects, objects with large amplitude $I_o$ values will be detected unless the amount of misregistration is close to zero (leading to small $\eta_D$) which is not practical. The discrimination of clutter with amplitude $I_c$ from target with amplitude $I_T$ required the output for the target to be substantially greater than that for the clutter. Since $\eta_D \approx 1$ for moving targets, one requires $\eta_s I_T >> \eta_s(\eta_D)^{\frac{1}{2}} I_C$ or $\eta_D << (I_T/I_C)^2$. If the target is weaker than the clutter in amplitude ($I_T < I_C$), $\eta_D$ must then be very small and require highly accurate scene registration.

The present invention addresses this problem. In accordance with the present teachings, the ratio of the output of the geometric mean circuit to the output of the spatial filter on the current image is examined as a measure of object misregistration. This ratio nominally takes on the value of the square root of $\eta_D$ (hereinafter the "difference ratio"). This quantity measures the degree of alignment of an object in the two images and therefore can be used to distinguish moving targets ($\eta_D \approx 1.0$) from nominally registered clutter ($\eta_D < 0.25$) without reference to their amplitudes.

Figure 3:
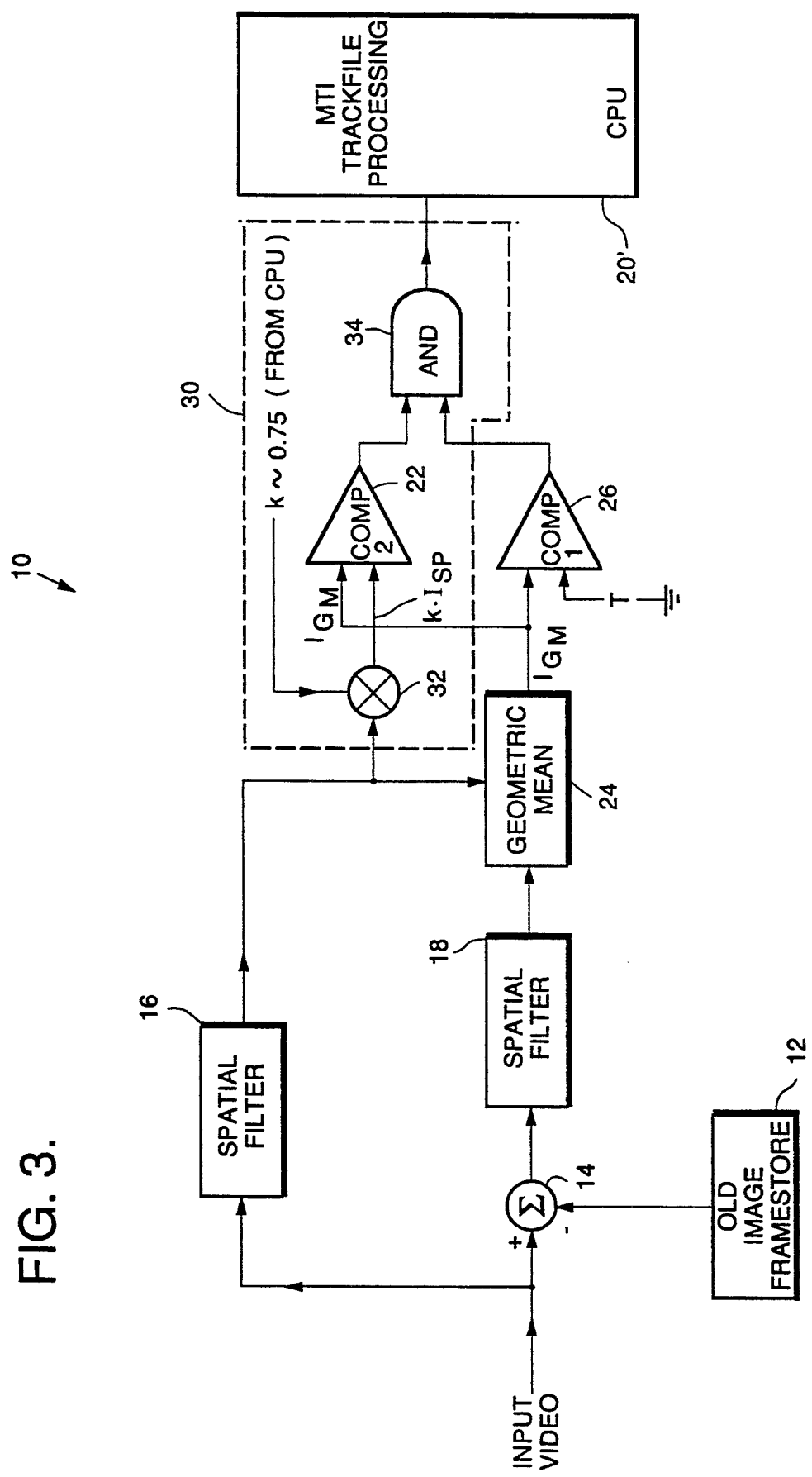
FIG. 3 is a block diagram of an illustrative hardware implementation of the moving target detection system of the present invention utilizing two-frame subtraction and amplitude ratio discrimination.

FIG. 3 is a block diagram of an illustrative hardware implementation of the moving target detection system 10 of the present invention utilizing two-frame subtraction and amplitude ratio discrimination. As with the conventional system 10', the inventive system 10 includes a memory 12 which stores a first frame of digitized image data having an amplitude $I_o$. The stored frame is subtracted from the current digitized frame of image data by a subtractor 14. The subtractor 14 outputs a difference signal $I_D = \eta_D I_o$. First and second spatial filters 16 and 18 are included. The first spatial filter 16 operates on the current frame and outputs a first spatially filtered signal $I_{sp} = \eta_s I_o$. The output of the first spatial filter 16 is input to a geometric mean circuit 24 and a multiplier 32 in a unique and novel amplitude ratio discrimination circuit 30 constructed in accordance with the present teachings. The difference signal is spatially filtered by the second spatial filter 18 and input to the geometric mean circuit 24. The output $I_{GM} = \eta_s (\eta_D)^{\frac{1}{2}} I_o$ of the geometric mean circuit 24 is input to a comparator 26. The output of the second comparator 26 is also input to the amplitude ratio discrimination circuit of the present invention. The amplitude ratio discrimination circuit 30 provides a means for processing spatially filtered difference signals of the form $\eta_s I_o (\eta_D)^{\frac{1}{2}}$ and the spatially filtered signal $\eta_s I_o$ to extract the measure of object misregistration $\eta_D$.

In the illustrative and preferred hardware implementation of FIG. 3, the amplitude ratio discrimination circuit 30 includes a comparator 22, multiplier 32 and an AND gate 34. The multiplier 32 scales the output of the first spatial filter 16 by a scale factor k. The scale factor k is supplied by a processor 20 and in the preferred embodiment is approximately equal to 0.75. In this embodiment, the first comparator 22 serves to test the ratio of spatially filtered signals $I_{SP} = \eta_s I_o$ representing a current image to the geometric mean of the difference signal $I_{GM}$ to provide the measure of track quality. The output of the first comparator is ANDed with the output of the second comparator 26 by the AND gate 34. The second comparator 26 compares the output of the geometric mean circuit 24 to a threshold T. The threshold T is set at several times the noise level. The second comparator 26 looks at significant differences for candidate targets, where small differences represent nonmovers. The output of the AND gate is input to the processor 20 for trackfile processing. Those skilled in the art will recognize other techniques for extracting a measure of object misregistration quality based on the difference ratio as taught herein.

Figure 4:
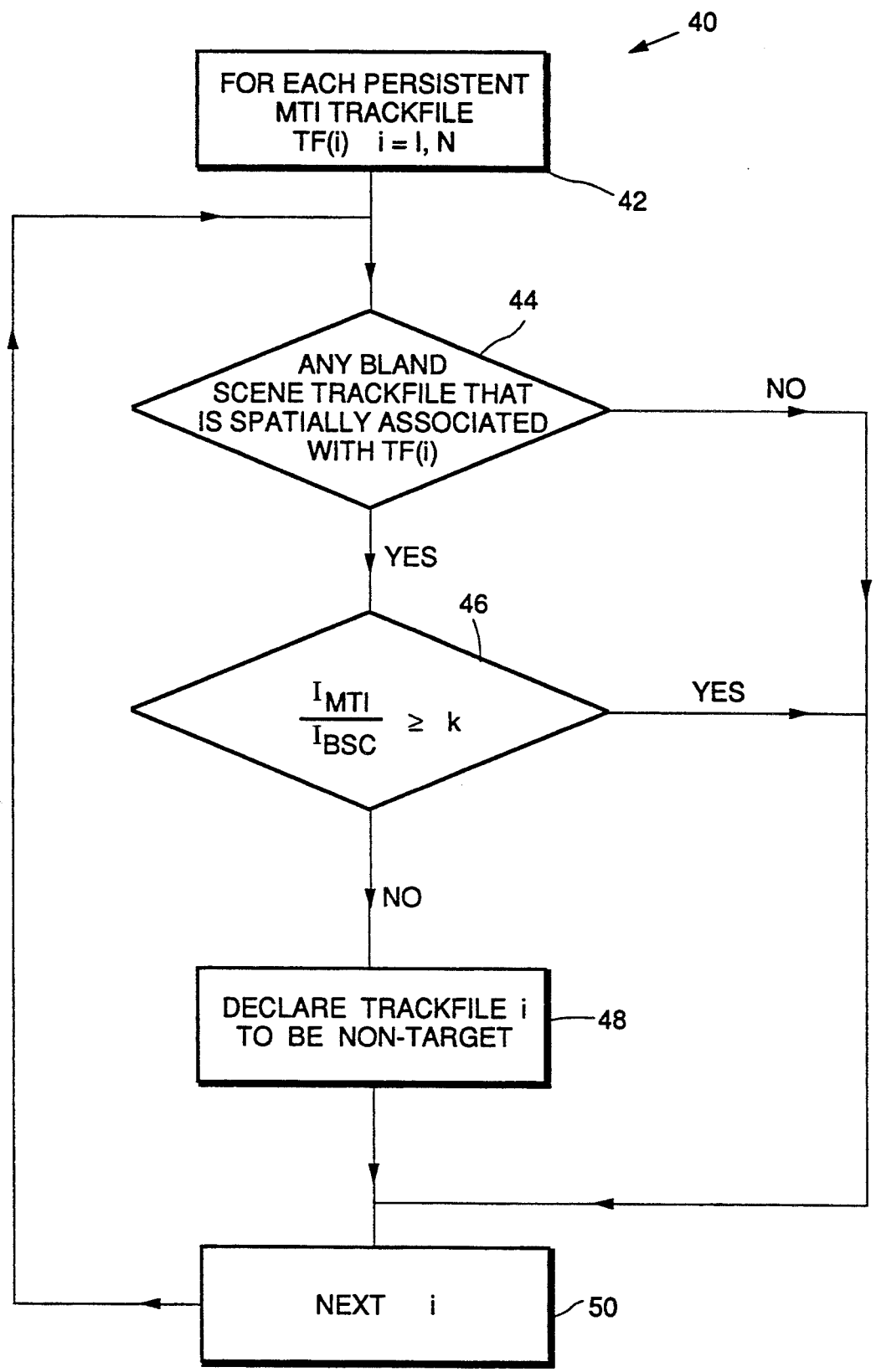
FIG. 4 is a flow chart of an illustrative software implementation of the moving target detection system of the present invention utilizing two-frame subtraction and amplitude ratio discrimination.

For example, FIG. 4 is a flow chart of an illustrative software implementation of the moving target detection system of the present invention utilizing two-frame subtraction and amplitude ratio discrimination. In this implementation, two trackfiles are maintained, one for the spatial filter outputs and one for the MTI processor outputs. The "bland scene" trackfile is the spatial filter trackfile. Pixels with $I_{GM} > T$ are sent to the processor 20 for MTI trackfile processing. Similarly, pixels with $I_{SP} > T$ are sent to the processor 20 for bland scene trackfile processing. In the standard two frame subtraction process, persistent MTI trackfiles are declared to be candidate targets. Discrimination of persistent nontarget MTI trackfiles can be performed at the trackfile level by comparing the intensity of the persistent MTI trackfiles to the intensity of spatially coincident bland scene trackfiles. If the intensity of the persistent MTI trackfiles is less than k (where k is a measure of $(\eta_D)^{\frac{1}{2}}$ and is ideally approximately 0.7) times the intensity of the corresponding bland scene trackfile, then the MTI trackfile is considered a nontarget and rejected. The comparison can be made only on MTI trackfiles that have spatially coincident bland scene trackfiles. That is, the program compares the magnitudes of the outputs and provides a target indication if for a given pixel "i", the ratio of the amplitude of the MTI outputs $I_{MTI}$ to that of the spatial filter output $I_{BSC}$ is greater than or equal to k.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for detecting an object in a scene comprising:

means for storing a first frame of image data represented by a plurality of input signals $I_o$;

first spatial filter means for spatially filtering a second frame of image data represented by a plurality of input signals $I_o$ to provide a first spatial filter output signal of the form $\eta_s I_o$;

means for subtracting said first frame of image data from said second frame of image data to provide difference signals of the form $\eta_D I_o$, where $\eta_D$ represents a measure of object registration in said first and second frames of image data;

second spatial filter means for spatially filtering said difference signals to provide spatially filtered difference signals of the form $\eta_s \eta_D I_o$; and means for processing said first spatial filter output signal and said spatially filtered difference signals of the form $\eta_s \eta_D I_o$ to extract said measure of object registration $\eta_D$, said means for processing said first spatial filter output signal and said spatially filtered difference signals of the form $\eta_s \eta_D I_o$ to extract said measure of object registration $\eta_D$ including means for multiplying said first spatial filter output signal of the form $\eta_s I_o$ by said difference signals of the form $\eta_D I_o$ and taking the geometric mean of the product to provide a geometric mean output signal $I_{GM}$.

2. The invention of claim 1 including first comparator means for comparing the amplitude of said geometric mean output signal $I_{GM}$ to the amplitude of the output of said first spatial filter means.

3. The invention of claim 2 including means for scaling the output of said first spatial filter means by a scale factor k.

4. The invention of claim 3 including second comparator means for comparing said geometric mean signals $I_{GM}$ to a threshold T.

5. The invention of claim 4 means for logically ANDing the output of said first comparator means and the output of said second comparator means.

6. A tracking system for a missile comprising:
   means for storing a first frame of image data represented by a plurality of input signals $I_o$;
   first spatial filter means for spatially filtering a second frame of image data represented by a plurality of input signals $I_o$ to provide a first spatial filter output signal of the form $\eta_s I_o$;
   means for subtracting said first frame of image data from said second frame of image data to provide difference signals of the form $\eta_D I_o$, where $\eta_D$ represents a measure of object registration;
   second spatial filter means for spatially filtering said difference signals to provide spatially filtered difference signals of the form $\eta_s \eta_D I_o$; and
   means for processing said first spatial filter output signal and said spatially filtered difference signals of the form $\eta_s \eta_D I_o$ to extract said measure of object registration $\eta_D$, said means for processing said spatially filtered difference signals of the form $\eta_s \eta_D I_o$ to extract said measure of object registration $\eta_D$, said means for processing said first spatial filter output signal and said spatially filtered difference signals including means for comparing the amplitude of said difference signals to the amplitude of the output of said first spatial filter means and means for multiplying said first spatial filter output signal of the form $\eta_s I_o$ by said difference signals of the form $\eta_D I_o$ and taking the geometric mean of the product to provide a geometric mean output signal $I_{GM}$.

7. The invention of claim 6 including first comparator means for comparing the amplitude of said geometric mean output signal $I_{GM}$ to the amplitude of the output of said first spatial filter means.

8. The invention of claim 7 including means for scaling the output of said first spatial filter means by a scale factor k.

9. The invention of claim 8 including second comparator means for comparing said geometric mean signals $I_{GM}$ to a threshold T.

10. The invention of claim 9 means for logically ANDing the output of said first comparator means and the output of said second comparator means.

11. A method for detecting an object in a scene including the steps of:
    storing a first frame of image data represented by a plurality of input signals $I_o$;
    spatially filtering a second frame of image data represented by a plurality of input signals $I_o$ to provide a first spatial filter output signal of the form $\eta_s I_o$;
    subtracting said first frame of image data from said second frame of image data to provide difference signals of the form $\eta_D I_o$, where $\eta_D$ represents a measure of object registration;
    spatially filtering said difference signals to provide spatially filtered difference signals of the form $\eta_s \eta_D I_o$; and
    processing said first spatial filter output signal and said spatially filtered difference signals of the form $\eta_s \eta_D I_o$ to extract said measure of object registration $\eta_D$, said means for processing said first spatial filter output signal and said spatially filtered difference signals of the form $\eta_s \eta_D I_o$ to extract said measure of object registration $\eta_D$ including means for multiplying said first spatial filter output signal of the form $\eta_s I_o$ by said difference signals of the form $\eta_D I_o$ and taking the geometric mean of the product to provide a geometric mean output signal $I_{GM}$.

* * * * *